United States Patent
Karwat et al.

(10) Patent No.: US 11,333,064 B1
(45) Date of Patent: May 17, 2022

(54) TURBOCHARGER BYPASS VALVE AND ACTUATOR ASSEMBLY THEREFOR HAVING GUIDED TOGGLE

(71) Applicant: Garrett Transportation I Inc., Torrance, CA (US)

(72) Inventors: Cedric Karwat, Nancy (FR); Vincent Eumont, Ludres (FR); Alexandre Wirtzler, Golbey (FR); Bruno Weber, Aydoilles (FR); Romain Guillot, Thaon les Vosges (FR)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 17/302,760

(22) Filed: May 11, 2021

(51) Int. Cl.
  *F02B 37/16* (2006.01)
  *F02B 37/18* (2006.01)
  *F02M 26/04* (2016.01)

(52) U.S. Cl.
  CPC ............ *F02B 37/16* (2013.01); *F02B 37/186* (2013.01); *F02M 26/04* (2016.02)

(58) Field of Classification Search
  CPC ........ F02B 37/16; F02B 37/186; F02D 11/04; F02D 9/10
  See application file for complete search history.

(56) References Cited

U.S. PATENT DOCUMENTS

| | | | |
|---|---|---|---|
| 4,261,546 A | 4/1981 | Cory et al. | |
| 2012/0128471 A1* | 5/2012 | Luck | F02B 37/24 415/158 |
| 2015/0226111 A1* | 8/2015 | Navarro | F02B 37/186 60/602 |
| 2015/0354441 A1* | 12/2015 | Luehrsen | F02B 39/16 415/1 |

FOREIGN PATENT DOCUMENTS

| | | | | |
|---|---|---|---|---|
| DE | 102004042880 A1 * | 3/2006 | ............. | F02B 31/06 |
| EP | 1387063 A2 | 2/2004 | | |

* cited by examiner

*Primary Examiner* — Ngoc T Nguyen
(74) *Attorney, Agent, or Firm* — John C. James

(57) ABSTRACT

A bypass valve assembly for a turbocharger includes a bypass valve having a valve stem rotatable about a valve stem axis for opening and closing the valve. The end of a first crank of an articulated two-bar linkage is connected to the valve stem. The end of a second crank of the linkage is connected to a cam follower engaged with a guide cam. An actuator provides motive force to the cam follower to proceed along the guide cam, which is configured to advance the cam follower along a guide path that is non-linear and non-circular arc, causing the two-bar linkage to rotate the valve stem. Valve stem angular displacement versus actuator stroke can be altered by modification of the shape of the guide path.

11 Claims, 9 Drawing Sheets

TURBOCHARGER BYPASS VALVE AND ACTUATOR ASSEMBLY THEREFOR HAVING GUIDED TOGGLE

BACKGROUND OF THE INVENTION

This application relates generally to turbochargers for internal combustion engines, and relates more particularly to bypass valves for allowing exhaust gases from the engine to bypass the turbine or for allowing air to bypass a compressor under certain operating conditions.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically, the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

Designing a turbocharger and properly matching it to a given engine is typically a compromise between attaining enough torque at low engine speeds and producing enough power at high engine speeds. If the designer chooses a small turbocharger in relation to the engine size, the turbocharger will be able to accelerate quickly because it is lightweight and has low inertia. Consequently, the turbocharger will be able to rapidly produce torque at low engine speeds. However, such a small turbocharger will reach its maximum speed quickly, after which it will not be able to provide the required boost to attain the maximum desired power at high engine speeds.

On the other hand, if the designer chooses a large turbocharger in relation to engine size, the turbocharger will be able to produce adequate power at high engine speeds but will be slow to accelerate because of its larger inertia, and hence will have difficulties in providing the desired boost at low engine speeds.

In view of these considerations, two-stage turbocharger arrangements have been developed which aim to have the best of both worlds. So-called "serial sequential two-stage" turbocharger arrangements have two turbines connected in serial sequential fashion, and two compressors connected in serial sequential fashion. One of the turbochargers is larger than the other, and is usually denoted the low-pressure (LP) turbocharger. The smaller turbocharger is referred to as the high-pressure (HP) turbocharger. The LP turbocharger is sized for providing the desired boost at high engine speed, and the HP turbocharger is sized for assisting the LP turbocharger at low engine speeds.

Accordingly, there are two different operating modes. At low engine speed the system is placed in a "two-stage" mode in which both turbos are working together, the small (HP) turbocharger providing the major part of the boost while the large (LP) turbocharger spools up gradually. At high engine speed the system is placed in a "mono-stage" (or LP stage) mode after the small (HP) turbo reaches its maximum speed, whereupon the HP turbo is bypassed and the large (LP) turbo is working alone. The transition from two-stage to mono-stage mode is accomplished with a turbine bypass valve (TBV) arranged such that when the TBV is opened, exhaust gas from the engine bypasses the HP turbine and goes directly to the LP turbine instead of first passing through the HP turbine. The TBV has a number of requirements. Ideally it should be perfectly sealed when fully closed, and should impact the overall system performance as little as possible when fully open. Typically, turbine bypass valves are binary, i.e., either fully closed or fully open.

More recently, however, because of desires for improved turbo performance as well as increasingly stringent limits on $CO_2$, $NO_x$, and $SO_x$ emissions, customers are requesting greater controllability and sensitivity from the TBV, to be able to finely control the TBV at the first degrees of opening, so as to better manage the small turbo bypass and thereby achieve a smoother transition from two-stage mode to mono-stage mode. However, the design of the typical turbine bypass valve is unsuitable for providing fine control of its initial opening phase.

An objective of the present invention is to allow high sensitivity (i.e., fine control) of the bypass valve during its initial opening phase, enabling a smooth transition from two-stage to mono-stage mode, while maintaining substantially the same open angle at the fully open position and without sacrificing sealing capabilities at the fully closed position.

SUMMARY OF THE DISCLOSURE

The present disclosure describes a bypass valve assembly having improved controllability as the valve begins to open. In accordance with one embodiment illustrated and described herein, a bypass valve assembly comprises a bypass valve connected to the actuator by means of a guided toggle arrangement. The bypass valve has a valve stem that is rotatable about a valve stem axis. The guided toggle arrangement comprises an articulated two-bar linkage comprising a first crank and a second crank each having a joint end and a connector end. The first and second cranks form a pivotal joint between the respective joint ends thereof, and the connector end of the first crank is fixedly connected to the valve stem such that the valve stem is constrained to rotate with the first crank about the valve stem axis. The bypass valve assembly further comprises an actuator assembly operably coupled with the connector end of the second crank, the actuator assembly structured and arranged to advance the connector end of the second crank in one direction along a guide path lying in a plane perpendicular to the valve stem axis to cause relative pivotal movement between the first and second cranks of the two-bar linkage and rotation of the valve stem about the valve stem axis so as to move the bypass valve from a closed position to an open position, and to retract the connector end of the second crank in an opposite direction along the guide path to move the bypass valve from the open position to the closed position. In accordance with an embodiment of the invention, the guide path as a whole is non-linear and non-circular arc.

The actuator assembly includes an actuator having an actuator member that is extendable and retractable along an actuator path, and further includes a guide defining a first cam surface. A cam follower is connected to the connector end of the second crank, the cam follower defining an outer peripheral surface in operable engagement with the first cam surface. The assembly includes a coupling link having a first end connected to the actuator member and an opposite second end connected to the cam follower. The first cam surface is configured to guide the cam follower to advance along the guide path as the actuator member extends and retracts along the actuator path.

In one embodiment, the actuator comprises a linear actuator, the actuator path being linear and being co-linear with an axis of the actuator member.

The cam follower can comprise a cam roller that is rotatable relative to the second crank of the two-bar linkage about a roller axis that is parallel to a joint axis of the two-bar linkage, the cam roller also being rotatable about said roller axis relative to the second end of the coupling link. The first end of the coupling link is pivotally connected to the actuator member.

In accordance with one embodiment, the guide comprises a guide track defining the first cam surface and further defining a second cam surface spaced from and parallel to the first cam surface, the second cam surface being configured to guide the cam roller to retract along the guide path.

In one embodiment, the guide is configured such that the guide path comprises a first portion followed by a second portion. At least one of the first and second portions diverges from the actuator path. In this case, when the bypass valve is in the closed position, the cam roller advantageously is within the first portion of the guide path, and when the bypass valve is in the open position, the cam roller is within the second portion of the guide path. The second portion of the guide path can be non-linear.

A method of opening and closing a bypass valve having a valve stem that is rotatable about a valve stem axis, in accordance with one embodiment described herein, comprises the steps of:
  providing an articulated two-bar linkage comprising a first crank and a second crank each having a joint end and a connector end, the joint ends of the first and second cranks being pivotally interconnected;
  connecting the connector end of the first crank fixedly to the valve stem such that the first crank is constrained to rotate with the valve stem about the valve stem axis; and
  providing an actuator assembly operably coupled with the connector end of the second crank, and operating the actuator assembly to advance the connector end of the second crank in one direction along a guide path lying in a plane perpendicular to the valve stem axis to cause relative pivotal movement between the first and second cranks of the two-bar linkage and rotation of the valve stem about the valve stem axis so as to move the bypass valve from a closed position to an open position, and operating the actuator assembly to retract the connector end of the second crank in an opposite direction along the guide path to move the bypass valve from the open position to the closed position, wherein the guide path as a whole is non-linear and non-circular arc.

The bypass valve assembly and method of the present disclosure enable the opening characteristics of the TBV to be tailored to whatever is desired, simply by suitably configuring the guide path dictated by the guide for the cam follower. Accordingly, the designer can configure the guide path to enable fine control over the initial opening phase of the TBV, while still achieving good sealing at the fully closed position and attaining the same opening angle at the fully open position.

BRIEF DESCRIPTION OF THE DRAWINGS

Having described the present disclosure in general terms, reference will now be made to the accompanying drawing(s), which are not necessarily drawn to scale, and wherein.

DETAILED DESCRIPTION OF THE DRAWINGS

The present disclosure will now be described in fuller detail with reference to the above-described drawings, which depict some but not all embodiments of the invention(s) to which the present disclosure pertains. These inventions may be embodied in various forms, including forms not expressly described herein, and should not be construed as limited to the particular exemplary embodiments described herein. In the following description, like numbers refer to like elements throughout.

Figure 1:
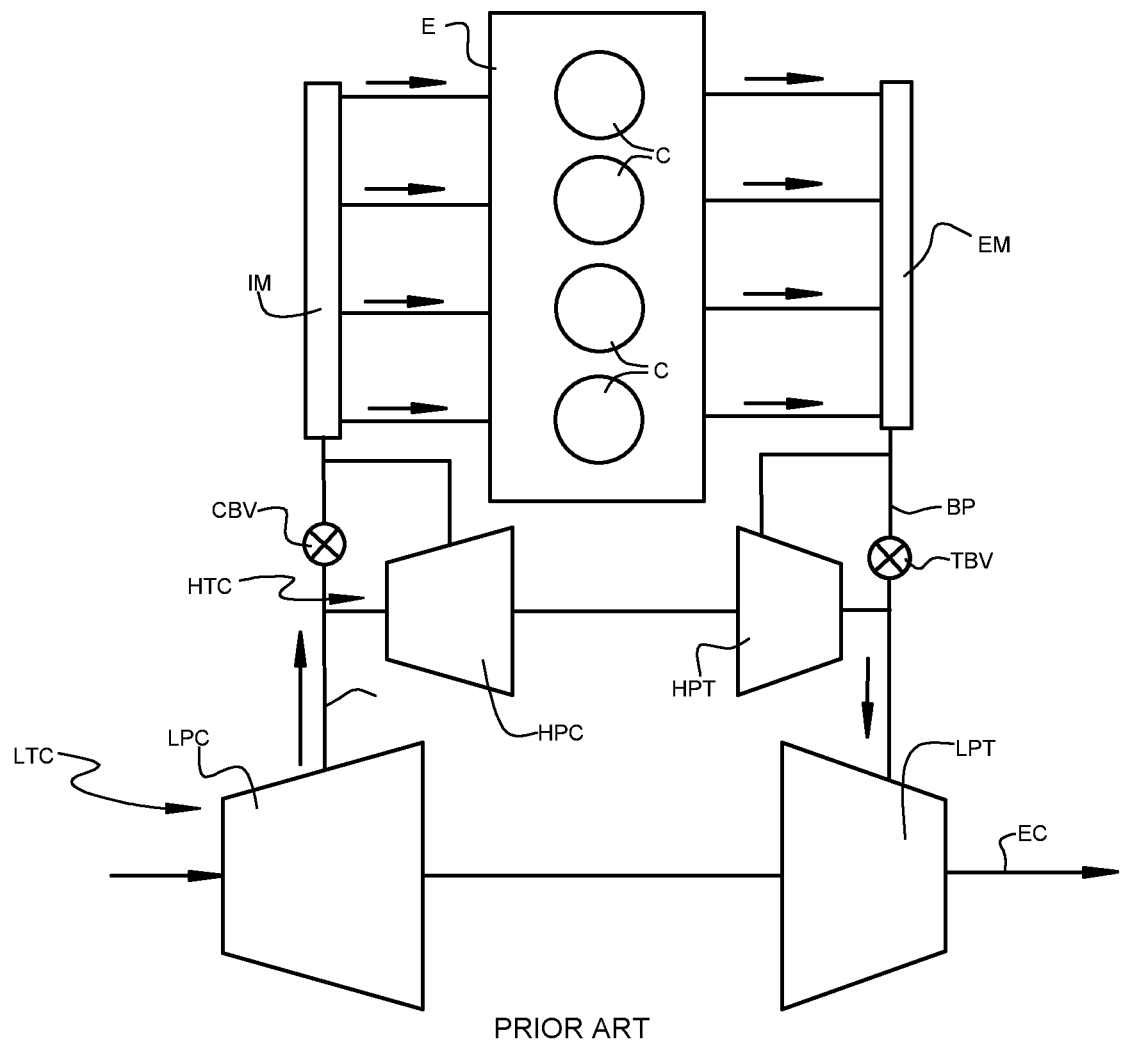
FIG. 1 is a schematic depiction of an engine having a twin turbocharger arrangement in accordance with prior art.

FIG. 1 illustrates a turbocharged engine system in accordance with prior art. The bypass valve assembly of the present invention is usable within such an engine system. The system includes an internal combustion engine E having a plurality of engine cylinders C. An intake manifold IM feeds intake air to each cylinder, and an exhaust manifold EM receives exhaust gas discharged from each cylinder. The air supplied to the intake manifold is boosted in pressure by a twin turbocharger arrangement comprising a low-pressure (LP) turbocharger LTC in series sequential connection with a high-pressure (HP) turbocharger HTC. The LP turbocharger comprises a low-pressure compressor LPC connected by a shaft to a low-pressure turbine LPT. The HP turbocharger comprises a high-pressure compressor HPC connected by a shaft to a high-pressure turbine HPT. The low-pressure compressor is in serial sequential connection with the high-pressure compressor, such that air pressurized by the LP compressor is fed to the HP compressor for further pressurizing, and then the air is supplied to the intake manifold IM. The high-pressure turbine is in series sequential connection with the low-pressure turbine, such that exhaust gas from the exhaust manifold EM is expanded through the HP turbine and then is fed to the LP turbine for further expansion before being discharged through an exhaust conduit EC.

In twin turbocharger arrangements such as that of FIG. 1, is it known to include a turbine bypass valve TBV for bypassing the HP turbine under some operating conditions, as previously described. The turbine bypass valve is arranged in a bypass passage BP around the HP turbine. When the valve is opened, exhaust gas substantially bypasses the HP turbine and proceeds directly to the LP turbine. Optionally, there can also be a compressor bypass valve CBV for bypassing the HP compressor whenever the HP turbine is bypassed. The present application concerns improvements to bypass valve assemblies for use in engine systems.

Figure 2A:
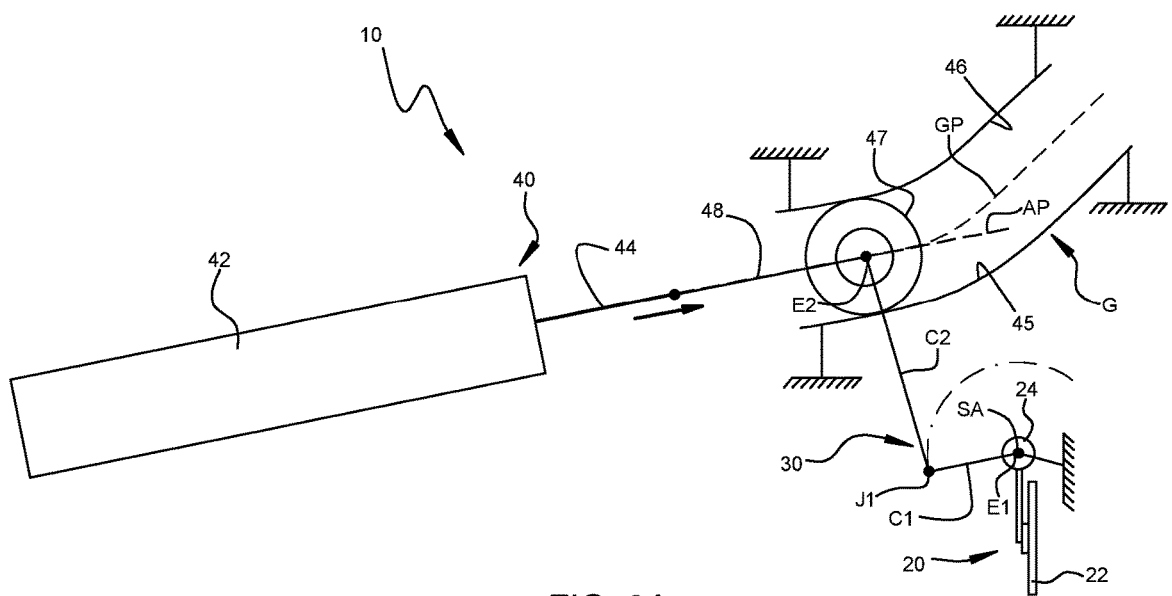
FIG. 2A is a diagrammatic illustration of a bypass valve assembly in accordance with a first embodiment of the invention, showing the assembly in a retracted state that places the bypass valve in a closed position.
Figure 2B:
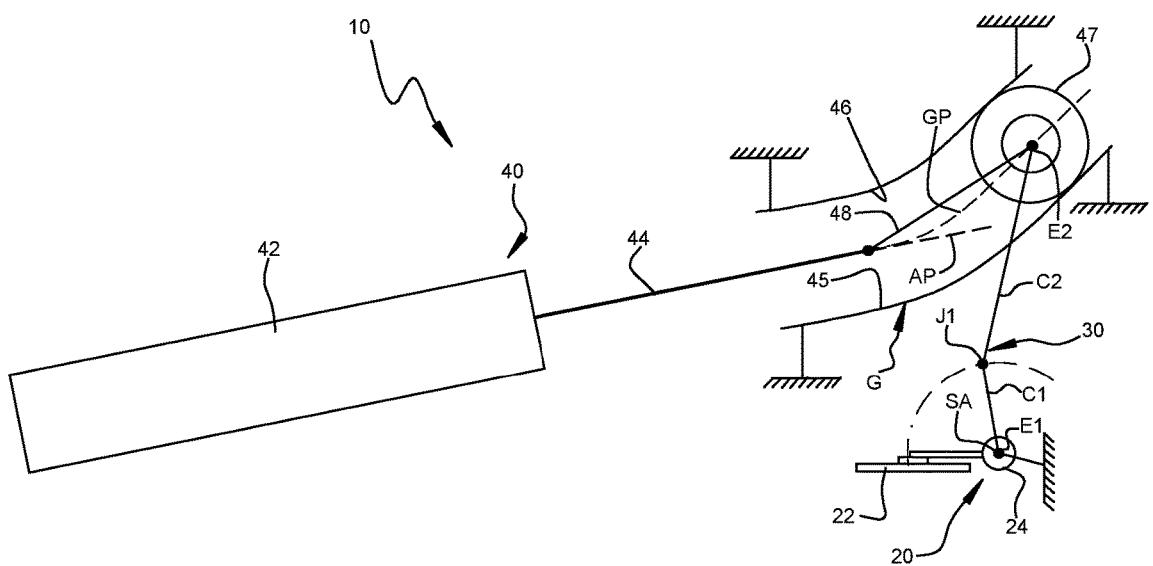
FIG. 2B shows the assembly of FIG. 2A in an extended state that places the bypass valve in an open position.

FIGS. 2A and 2B illustrate a bypass valve assembly 10 in accordance with a first embodiment of the invention. The assembly includes a bypass valve 20 having a valve member 22 fixedly joined to a valve stem 24 that is rotatable about a valve stem axis SA (perpendicular to the plane of FIGS. 2A and 2B). The assembly further includes an articulated two-bar linkage 30 comprising a first crank C1 and a second crank C2. Each of the cranks has a joint end and a connector end, and the two cranks forms a pivotal joint J1 between the respective joint ends thereof. The connector end E1 of the first crank C1 is fixedly connected to the valve stem 24 such that the valve stem is constrained to rotate with the first crank about the valve stem axis SA. The assembly further comprises an actuator assembly 40 operably coupled with the connector end E2 of the second crank C2. The actuator assembly is structured and arranged to advance the connector end E2 of the second crank C2 in one direction along a guide path GP lying in a plane perpendicular to the valve stem axis SA to cause relative pivotal movement between the first crank C1 and second crank C2 of the two-bar linkage 30 and rotation of the valve stem 24 about the valve stem axis SA so as to move the bypass valve 20 from a closed position as shown in FIG. 2A to an open position as shown in FIG. 2B. The actuator assembly is operable to retract the connector end E2 of the second crank C2 in an opposite direction along the guide path GP to move the bypass valve from the open position to the closed position. In accordance with this embodiment of the invention, the guide path GP as a whole is non-linear and non-circular arc, which in the present disclosure means that while one or more portions of the guide path may be linear, and one or more portions may be a circular arc, the guide path as a whole cannot be represented by a straight line or a circular arc of constant radius of curvature.

The valve stem axis SA is fixed in orientation and position, and the first crank C1 rotates about the valve stem axis, such that the joint J1 of the two-bar linkage is constrained to move along a circular arc centered on the valve stem axis and lying in a plane that is perpendicular to the valve stem axis. The connector end E2 of the second crank C2 is constrained to move along the guide path GP.

In accordance with the first embodiment, the actuator assembly 40 comprises an actuator 42 having an actuator member 44 that is extendable and retractable along an actuator path AP. The actuator assembly further comprises a guide G defining a first cam surface 45 and a second cam surface 46 spaced from and generally parallel to the first cam surface, thus forming a cam track. The assembly includes a cam follower 47 connected to the connector end E2 of the second crank C2. The cam follower 47 defines an outer peripheral surface in operable engagement with the first cam surface 45 and with the second cam surface 46, and a coupling link 48 having a first end connected to the actuator member 44 and an opposite second end connected to the cam follower 47. The first cam surface 45 is configured to guide the cam follower to advance along the guide path GP (left to right in FIGS. 2A and 2B) and the second cam surface 46 is configured to guide the cam follower to retract along the guide path (right to left in FIGS. 2A and 2B). The coupling link 48 is rotatably connected to the actuator member 44 so as to permit relative rotation therebetween, as shown for example in FIG. 2B versus FIG. 2A.

In the illustrated embodiment, the actuator 42 comprises a linear actuator, and the actuator path AP is linear and is co-linear with an axis of the actuator member 44.

The cam follower 47 can comprise a cam roller that is rotatable relative to the second crank C2 of the two-bar linkage 30 about a roller axis that is parallel to a joint axis of the two-bar linkage. The cam roller also is rotatable about said roller axis relative to the second end of the coupling link.

In the illustrated embodiment, the guide G is configured such that the guide path GP comprises a first portion followed by a second portion. When the turbine bypass valve 20 is in the closed position as in FIG. 2A, the cam roller 47 is within the first portion of the guide path, and when the bypass valve is in the open position as in FIG. 2B, the cam roller is within the second portion of the guide path. The second portion of the guide path in this embodiment is non-linear.

It will be appreciated that the opening characteristics of the bypass valve 20 are dependent in part on the shape of the guide path GP. That is, for a given rate of displacement of the actuator member 44, and all other factors being equal, the bypass valve can be made to open at a greater or lesser rate by modifying the shape of the guide path. The opening characteristics are also dependent on the relative lengths of the two cranks C1 and C2. Accordingly, the bypass valve designer can attain the desired opening characteristics by suitable selection of these parameters.

Figure 3A:
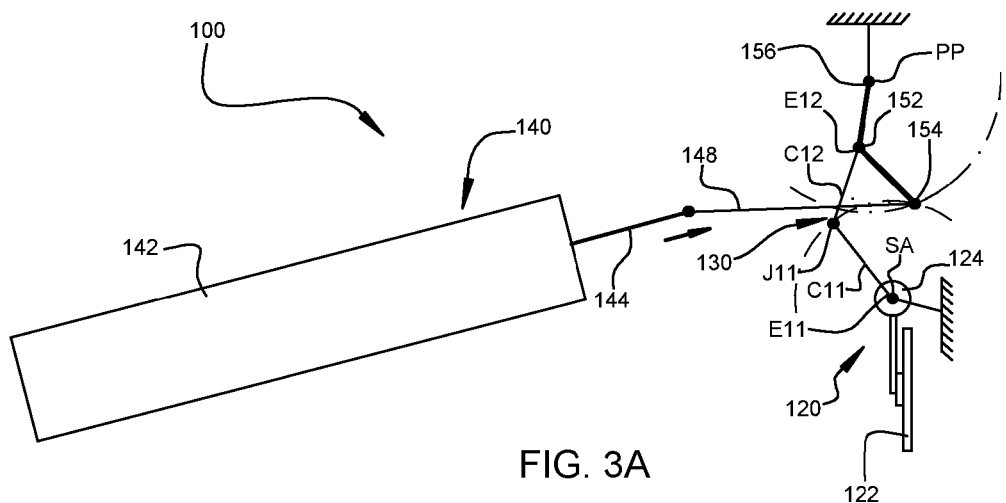
FIG. 3A depicts a bypass valve assembly in accordance with a second embodiment, showing the assembly in a retracted state that places the valve in a closed position.
Figure 3B:
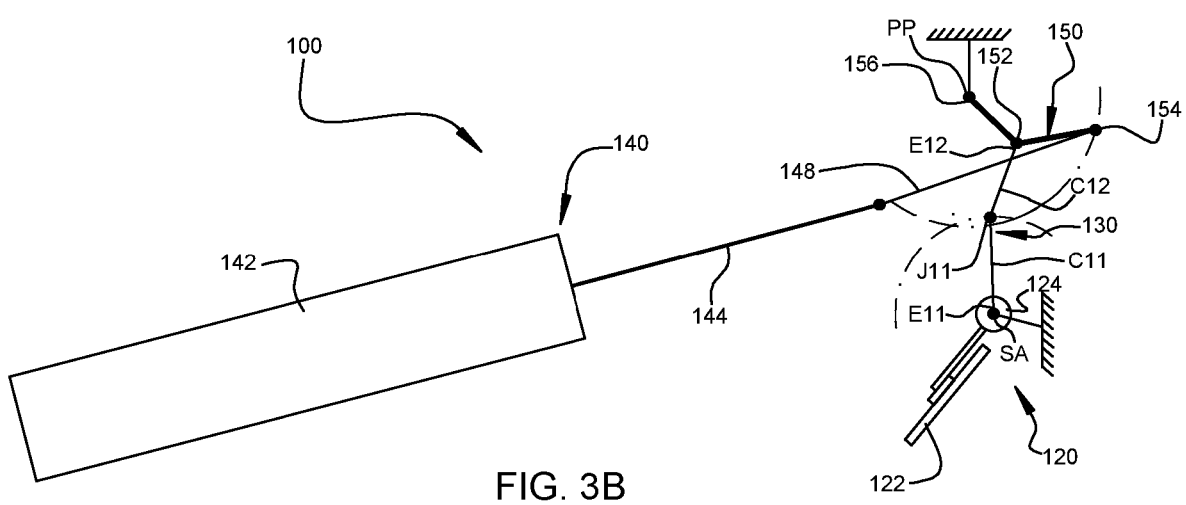
FIG. 3B shows the assembly of FIG. 3A in an extended state that places the valve in an open position.

A bypass valve assembly in accordance with a second embodiment of the invention is depicted in FIGS. 3A and 3B. The bypass valve assembly 110 includes a bypass valve 120 having a valve member 122 fixedly joined to a valve stem 124 that is rotatable about a valve stem axis SA (perpendicular to the plane of FIGS. 3A and 3B). The assembly further includes an articulated two-bar linkage 130 comprising a first crank C11 and a second crank C12. Each of the cranks has a joint end and a connector end, and the two cranks forms a pivotal joint ill between the respective joint ends thereof. The connector end E11 of the first crank C11 is fixedly connected to the valve stem 124 such that the valve stem is constrained to rotate with the first crank about the valve stem axis SA. Accordingly, the pivotal joint ill is constrained to move along a circular arc that has its center at the valve stem axis SA. The assembly further comprises a reducer crank 150 having a dog-leg or banana shape that results in the two opposite end portions of the link forming an obtuse angle therebetween. In the diagrammatic depiction in FIGS. 3A and 3B, the reducer crank 150 is shown as having two linear portions that come together at a vertex 152 forming said obtuse angle; however, the crank alternatively could be more smoothly curved like a banana. In any case, at the vertex (or some suitably located point intermediate the two ends of the reducer crank) the connector end E12 of the second crank C12 is connected in a pivotal fashion so as to permit relative pivotal movement between the reducer crank 150 and the second crank C12.

The bypass valve assembly in accordance with the second embodiment further comprises an actuator assembly 140 including an actuator 142 having an actuator member 144 that is extendable and retractable along an actuator path. A distal end of the actuator member is pivotally connected to one end of a coupling link 148. An opposite end of the coupling link 148 is pivotally connected to one end 154 of the reducer crank. The opposite end 156 of the reducer crank is pivotally connected to a fixed pivot point PP. Accordingly, the end 154 of the reducer crank connected to the two-bar linkage 130 is constrained to move along a circular arc whose center is at the fixed pivot point PP.

FIG. 3A shows the actuator member 144 in a retracted position corresponding to a closed position of the bypass valve 120. When the actuator member is extended (toward the right in FIG. 3A), it causes the coupling link 148 to advance the end 154 of the reducer crank 150 along a circular-arc path around fixed pivot point PP, which in turn causes the two-bar linkage 130 to rotate about the valve stem axis SA, thereby rotating the valve stem 124 so as to move the valve member 122 from the closed position toward the open position of FIG. 3B. Retraction of the actuator member moves the valve member toward the closed position of FIG. 3A.

It will be appreciated that the opening characteristics of the bypass valve 120 will be dependent upon the geometries of the two-bar linkage 130 and the reducer crank 150. For example, the location of the vertex 152 at which the coupling link 148 connects with the reducer crank 150, relative to the fixed pivot point PP, influences how sensitive the movement of the valve member 122 is to displacement of the actuator member 144. All other things being equal, locating the vertex 152 closer to the pivot point PP reduces the amount of valve member movement for a given actuator member displacement. The relative lengths of the first crank C11 and second crank C12 also influence the opening characteristics. Accordingly, the bypass valve designer can attain the desired opening characteristics by suitable selection of these parameters.

Figure 4:
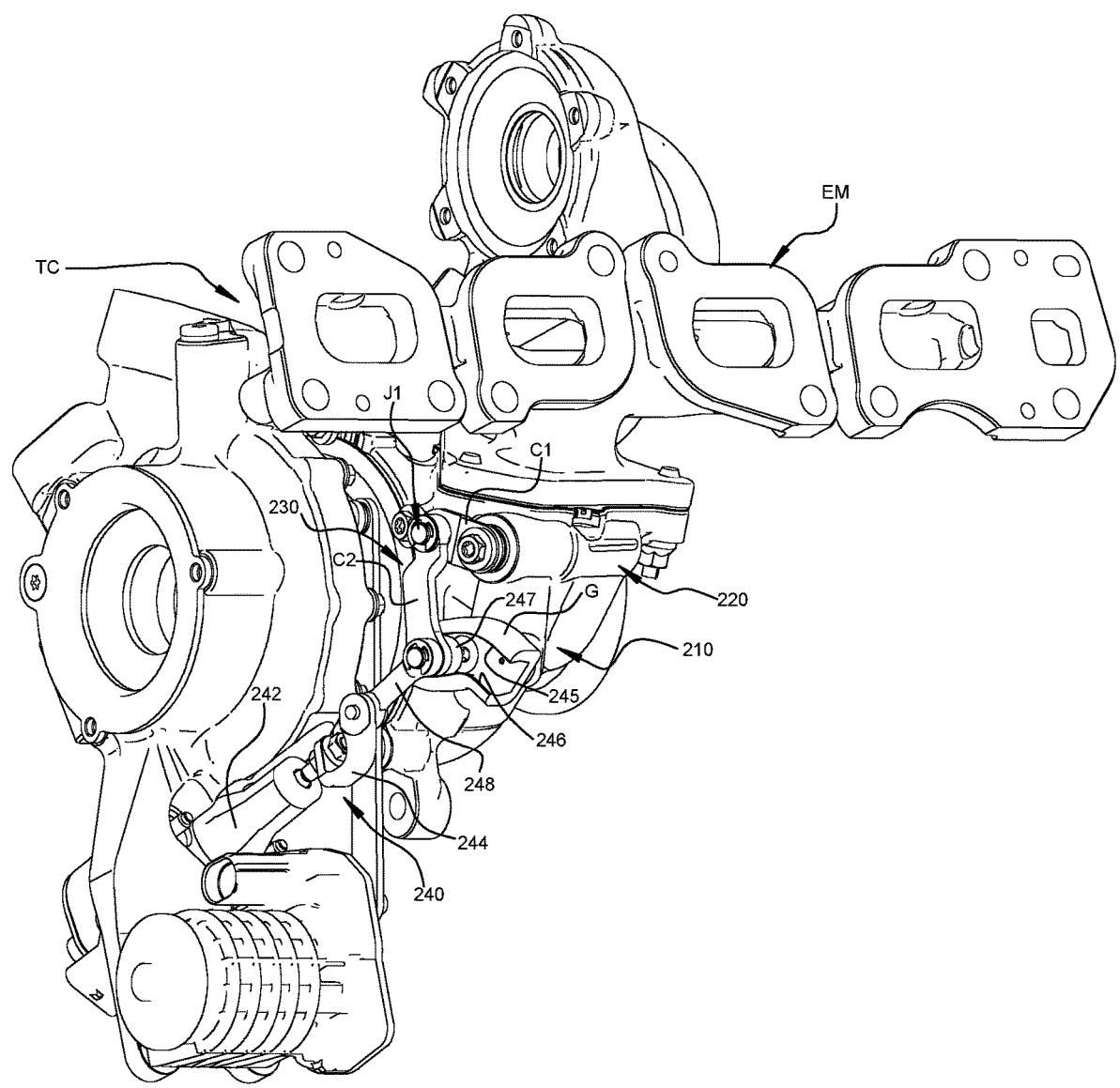
FIG. 4 is an isometric view of a turbocharger whose turbine is equipped with a bypass valve assembly in accordance with a third embodiment of the invention.
Figure 5:
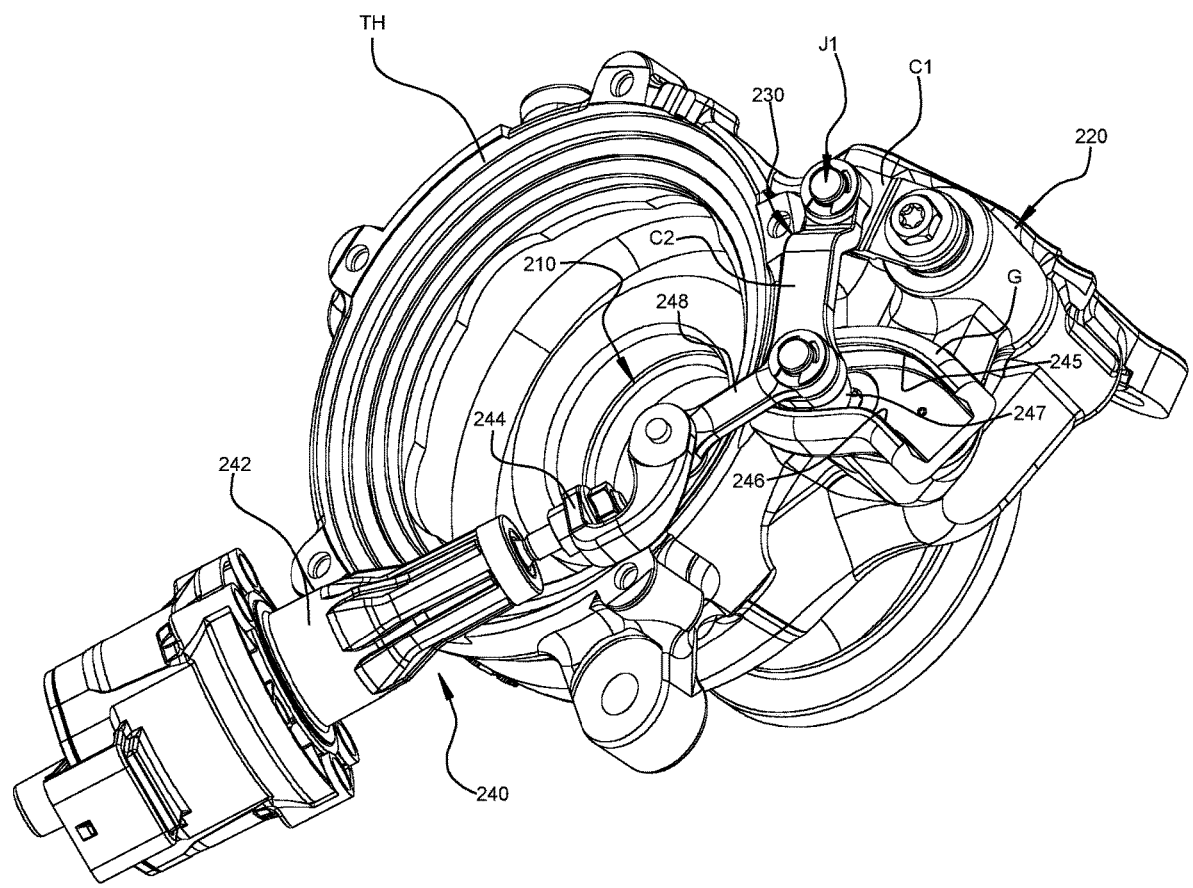
FIG. 5 is an isometric view of a sub-assembly of the turbocharger of FIG. 4, including a turbine housing and the bypass valve assembly.
Figure 6:
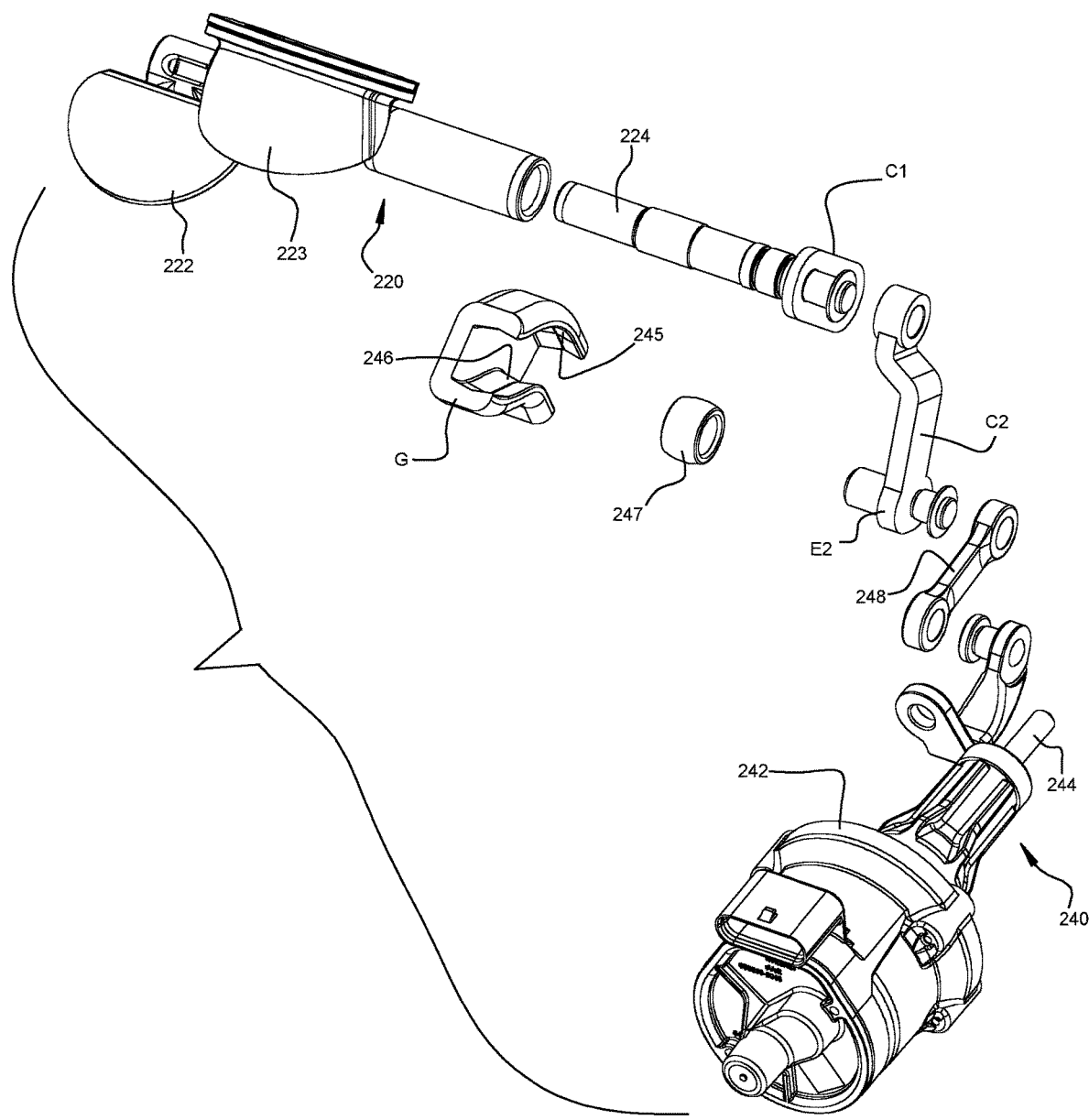
FIG. 6 is an exploded view of the bypass valve assembly in accordance with the third embodiment of the invention.
Figure 7:
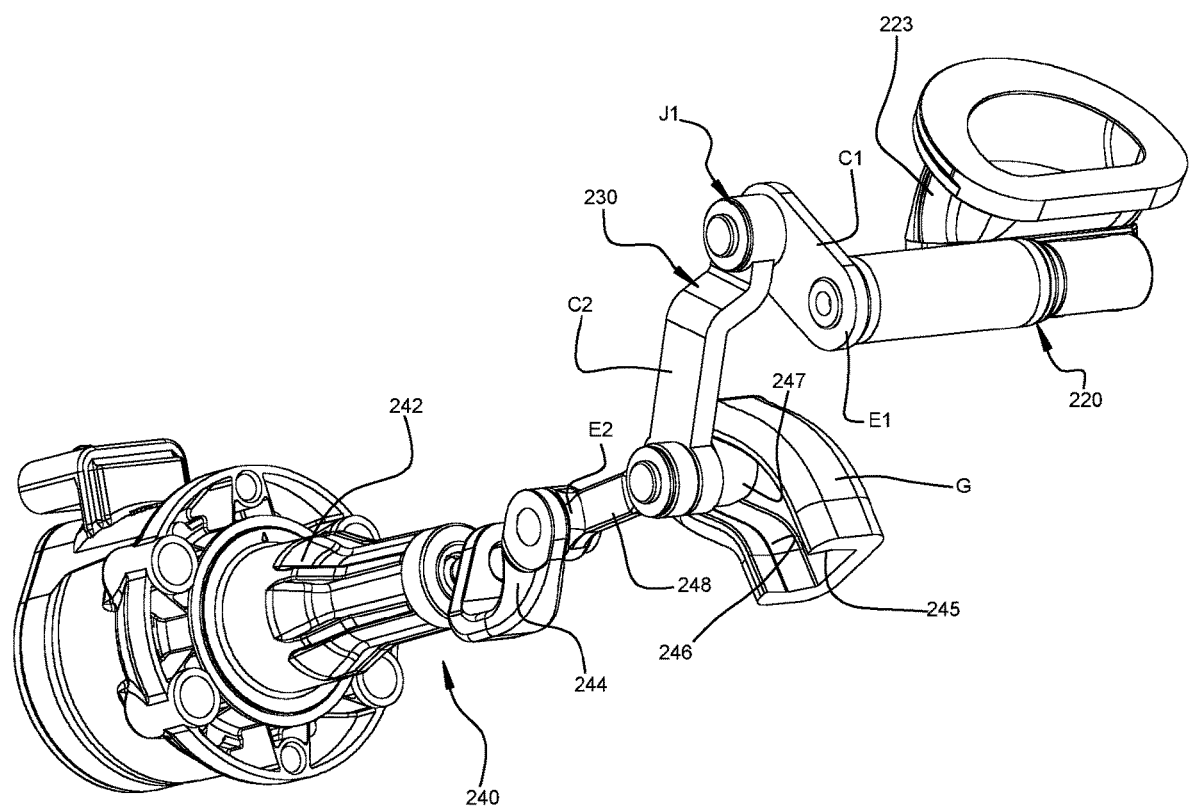
FIG. 7 is an isometric view of the bypass valve assembly in accordance with the third embodiment.

FIG. 4 depicts a turbocharger TC having a turbine bypass valve assembly 210 in accordance with a third embodiment of the invention. An exhaust manifold EM is also shown connected to a turbine housing of the turbocharger for feeding exhaust gas to the turbine. A turbine bypass valve 220 is positioned such that when the valve is opened, substantially all of the exhaust gas bypasses the turbine instead of passing through the turbine. Alternatively, when the valve is closed, the exhaust gas passes through the turbine. FIG. 5 shows a sub-assembly of the arrangement of FIG. 4, depicting only the bypass valve assembly 210 coupled with the turbine housing TH. FIG. 6 is an exploded view of the bypass valve assembly and FIG. 7 shows an isometric view of the assembly.

Figure 8A:
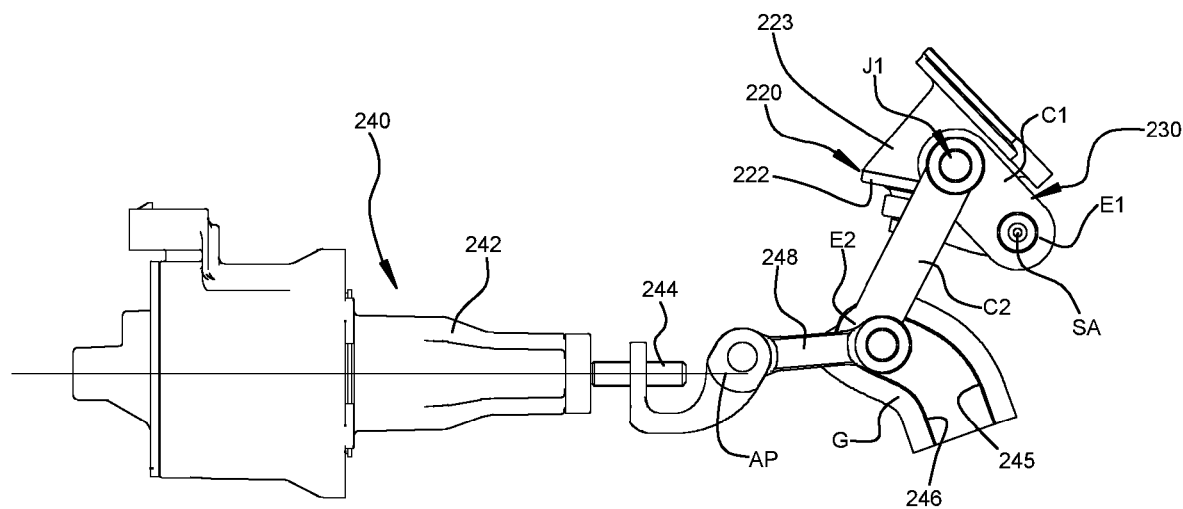
FIG. 8A is a front view of the bypass valve assembly in accordance with the third embodiment of the invention, showing the assembly in a retracted state that places the bypass valve in a closed position.
Figure 8B:
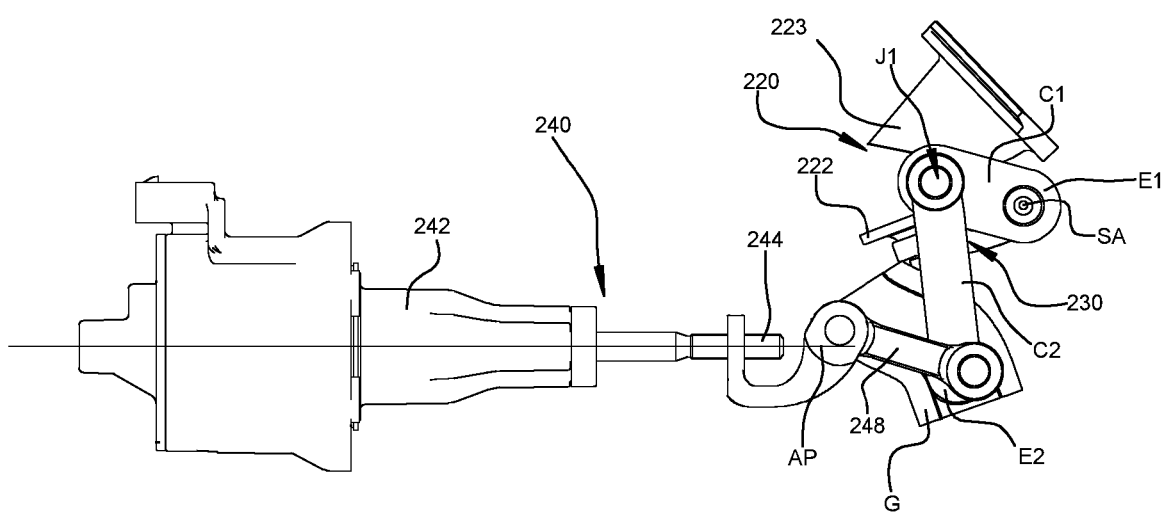
FIG. 8B shows the assembly of FIG. 8A in an extended state that places the bypass valve in an open position.

With reference to FIGS. 4 through 7, the bypass valve assembly 210 comprises a bypass valve 220 having a valve member 222 that has a valve stem 224 (visible in FIG. 6). Rotation of the valve stem about its longitudinal axis causes the valve member to be moved between a closed position (FIG. 8A) and an open position (FIG. 8B). In the closed position, the valve member 222 sealingly engages a valve seat defined on a bypass passage 223 so as to prevent exhaust gas from passing through the bypass passage. When the valve member is opened, the bypass passage is opened for exhaust gas flow.

The bypass valve assembly further comprises a two-bar linkage 230 having a first crank C1 and a second crank C2 that are pivotally connected at a joint J1. A first end E1 of the first crank C1 of the two-bar linkage is fixedly connected to the valve stem 224 of the valve such that the first crank C1 is constrained to pivot together with the valve stem about the valve stem axis SA (FIGS. 8A and 8B). An opposite second end E2 of the second crank C2 of the two-bar linkage is pivotally connected to one end of a coupling link 248. The second end E2 of the second crank C2 is also connected to a cam follower 247 comprising a cam roller. The cam roller is engaged in a cam track of a guide G. The cam track defines a first cam surface 245 and a second cam surface 246 generally parallel to and spaced from the first cam surface. The cam track of the guide defines a guide path along which the cam roller is constrained to travel. The guide is configured such that the guide path as a whole is non-linear and non-circular arc.

The cam roller 247 is caused to travel along the guide path defined by the guide G by an actuator assembly 240. The actuator assembly comprises an actuator 242 having an actuator member 244 that is extendable and retractable along an actuator path AP (FIGS. 8A and 8B). The actuator member is rotatably coupled with the opposite end of the coupling link 248. Thus, starting with the bypass valve 220 in the closed position shown in FIG. 8A (actuator member 244 in a retracted state), extension of the actuator member causes the cam roller 247 to travel along the cam track of the guide, which causes the two-bar linkage 230 to pivot about the valve stem axis SA and impart rotary movement to the valve stem so as to open the valve as shown in FIG. 8B. Subsequent retraction of the actuator member causes the cam roller to return to the starting point to close the valve again.

Figure 9:
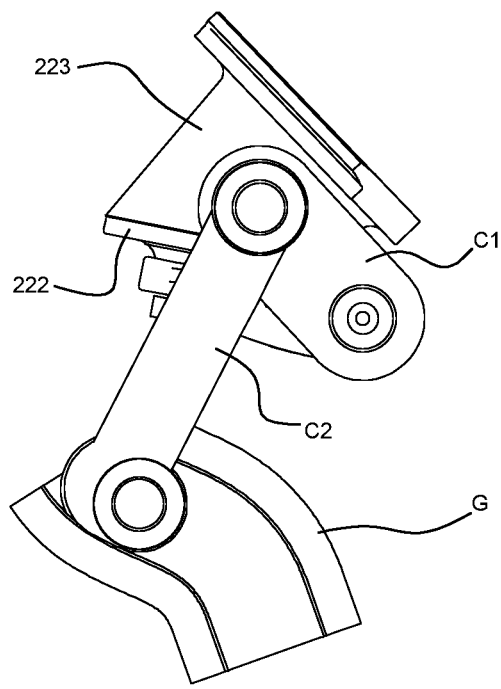
FIG. 9 is a front view of a sub-assembly of a bypass valve, two-bar linkage, cam roller, and guide in accordance with the invention, illustrating one possible guide configuration.
Figure 10:
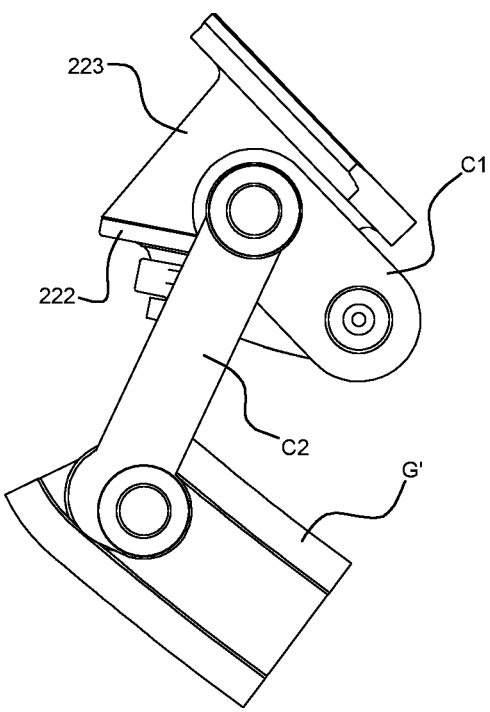
FIG. 10 is similar to FIG. 9, but illustrates another possible guide configuration in accordance with the invention.

As previously noted, the opening characteristics of the bypass valve 220 are dependent in part on the shape of the guide path defined by the guide G. That is, for a given rate of displacement of the actuator member 244, and all other factors being equal, the bypass valve can be made to open at a greater or lesser rate by modifying the shape of the guide path. The opening characteristics are also dependent on the relative lengths of the two cranks C1 and C2. Accordingly, the bypass valve designer can attain the desired opening characteristics by suitable selection of these parameters. For example, FIG. 9 depicts one possible configuration for the guide G, and FIG. 10 depicts a guide G' having a different configuration. Both of these guides can achieve the same full-open angle for the valve member, but they will exhibit different characteristics in terms of a curve of angle versus actuator displacement. These are only two exemplary configurations, the invention not being limited in terms of guide configuration.

Persons skilled in the art, on the basis of the present disclosure, will recognize that modifications and other embodiments of the inventions described herein can be made without departing from the inventive concepts described herein. Specific terms used herein are employed for explanatory purposes rather than purposes of limitation.

Accordingly, the inventions are not to be limited to the specific embodiments disclosed, and modifications and other embodiments are intended to be included within the scope of the appended claims.

What is claimed is:

1. A bypass valve assembly for a turbocharger, comprising:
   a bypass valve having a valve stem that is rotatable about a valve stem axis;
   an articulated two-bar linkage comprising a first crank and a second crank each having a joint end and a connector end, the first and second cranks forming a pivotal joint between the respective joint ends thereof, the connector end of the first crank being fixedly connected to the valve stem such that the valve stem is constrained to rotate with the first crank about the valve stem axis; and
   an actuator assembly operably coupled with the connector end of the second crank, the actuator assembly structured and arranged to advance the connector end of the second crank in one direction along a guide path lying in a plane perpendicular to the valve stem axis to cause relative pivotal movement between the first and second cranks of the two-bar linkage and rotation of the valve stem about the valve stem axis so as to move the bypass valve from a closed position to an open position, and to retract the connector end of the second crank in an opposite direction along the guide path to move the bypass valve from the open position to the closed position, wherein the guide path as a whole is non-linear and non-circular arc.

2. The bypass valve assembly of claim 1, the actuator assembly comprising an actuator having an actuator member that is extendable and retractable along an actuator path, the actuator assembly further comprising a guide defining a first cam surface, a cam follower connected to the connector end of the second crank, the cam follower defining an outer peripheral surface in operable engagement with the first cam surface, and a coupling link having a first end connected to the actuator member and an opposite second end connected to the cam follower, wherein the first cam surface is configured to guide the cam follower to advance along the guide path.

3. The bypass valve assembly of claim 2, wherein the actuator comprises a linear actuator, the actuator path being linear and being co-linear with an axis of the actuator member.

4. The bypass valve assembly of claim 3, wherein the cam follower comprises a cam roller that is rotatable relative to the second crank of the two-bar linkage about a roller axis that is parallel to a joint axis of the two-bar linkage, the cam roller also being rotatable about said roller axis relative to the second end of the coupling link.

5. The bypass valve assembly of claim 4, wherein the first end of the coupling link is pivotally connected to the actuator member.

6. The bypass valve assembly of claim 5, wherein the guide comprises a guide track defining the first cam surface and further defining a second cam surface spaced from and parallel to the first cam surface, the second cam surface being configured to guide the cam roller to retract along the guide path.

7. The bypass valve assembly of claim 5, wherein the guide is configured such that the guide path comprises a first portion, followed by a second portion, wherein at least one of the first and second portions diverges from the actuator path.

8. The bypass valve assembly of claim 7, wherein when the bypass valve is in the closed position, the cam roller is within the first portion of the guide path, and when the bypass valve is in the open position, the cam roller is within the second portion of the guide path.

9. The bypass valve assembly of claim 8, wherein the second portion of the guide path is non-linear.

10. A turbocharger assembly for an internal combustion engine, comprising:
    a low-pressure turbocharger comprising a low-pressure turbine coupled with a low-pressure compressor;
    a high-pressure turbocharger comprising a high-pressure turbine coupled with a high-pressure compressor, wherein the low-pressure compressor and the high-pressure compressor are in series sequential connection, and the low-pressure turbine and the high-pressure turbine are in series sequential connection; and
    a bypass valve assembly according to any one of claims 1-9, wherein the bypass valve is arranged in a bypass passage around one of the high-pressure compressor and the high-pressure turbine.

11. A method of opening and closing a bypass valve having a valve stem that is rotatable about a valve stem axis, the method comprising the steps of:
    providing an articulated two-bar linkage comprising a first crank and a second crank each having a joint end and a connector end, the joint ends of the first and second cranks being pivotally interconnected;
    connecting the connector end of the first crank fixedly to the valve stem such that the first crank is constrained to rotate with the valve stem about the valve stem axis; and
    providing an actuator assembly operably coupled with the connector end of the second crank, and operating the actuator assembly to advance the connector end of the second crank in one direction along a guide path lying in a plane perpendicular to the valve stem axis to cause relative pivotal movement between the first and second cranks of the two-bar linkage and rotation of the valve stem about the valve stem axis so as to move the bypass valve from a closed position to an open position, and operating the actuator assembly to retract the connector end of the second crank in an opposite direction along the guide path to move the bypass valve from the open position to the closed position, wherein the guide path as a whole is non-linear and non-circular arc.

* * * * *